(12) United States Patent
An

(10) Patent No.: US 7,896,370 B2
(45) Date of Patent: Mar. 1, 2011

(54) TRAILING ARM MOUNTING DEVICE FOR VEHICLE WITH SMALL-SIZED FRAME

(75) Inventor: Yongdok An, Goyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 209 days.

(21) Appl. No.: 11/962,839

(22) Filed: Dec. 21, 2007

(65) Prior Publication Data

US 2009/0121106 A1    May 14, 2009

(30) Foreign Application Priority Data

Oct. 5, 2007    (KR)    ...................... 10-2007-0100255

(51) Int. Cl.
*B60G 3/12*    (2006.01)
(52) U.S. Cl. ........................ 280/124.128; 280/124.109; 280/781; 180/311
(58) Field of Classification Search .......... 280/124.128, 280/781, 124.109; 180/311; 248/231.9, 248/629, 636
See application file for complete search history.

(56) References Cited

U.S. PATENT DOCUMENTS

| 3,484,119 | A | * | 12/1969 | Cagle | .......................... | 280/104 |
| 4,432,564 | A | * | 2/1984 | Tronville | .............. | 280/124.106 |
| 4,830,396 | A | * | 5/1989 | Gandiglio | ............ | 280/124.109 |
| 5,393,096 | A | * | 2/1995 | Pierce et al. | ................ | 280/788 |
| 7,040,639 | B2 | * | 5/2006 | Tamura | ............... | 280/124.147 |
| 7,229,098 | B2 | * | 6/2007 | Mangalaramanan et al. | .......................... | 280/781 |
| 7,350,795 | B2 | * | 4/2008 | Svartz et al. | .......... | 280/124.163 |
| 7,377,041 | B2 | * | 5/2008 | Ok et al. | .................... | 29/897.2 |
| 7,575,243 | B2 | * | 8/2009 | Takahashi | ............ | 280/124.128 |
| 2005/0099060 | A1 | * | 5/2005 | Choi | .......................... | 301/127 |
| 2006/0066090 | A1 | * | 3/2006 | Jennings et al. | ............. | 280/781 |
| 2006/0181047 | A1 | * | 8/2006 | Chamberlin et al. | .. | 280/124.128 |
| 2007/0126200 | A1 | * | 6/2007 | Ogawa et al. | ......... | 280/124.169 |
| 2008/0252031 | A1 | * | 10/2008 | Dudding et al. | ....... | 280/124.116 |
| 2009/0315291 | A1 | * | 12/2009 | D'Aponte et al. | ..... | 280/124.128 |

FOREIGN PATENT DOCUMENTS

| JP | 2000-335448 | 9/2000 |
| JP | 2002-127935 | 5/2002 |

(Continued)

OTHER PUBLICATIONS

Suzuki et al., Rear Suspension Structure of Vehicle, Jul. 13, 2006, JPO, English Abstract.*

(Continued)

*Primary Examiner*—Toan C To
*Assistant Examiner*—James English
(74) *Attorney, Agent, or Firm*—Morgan, Lewis & Bockius LLP

(57) ABSTRACT

The present invention relates to a trailing arm mounting device for a vehicle with a small-sized frame, in which mounting assembly that connects small-sized frame and the trailing arm and has a limit on the weight and cross-section by reducing the size of frame expands the fixing portion for small-sized frame, such that the fastening force to the mounting assembly is increased and the dynamic stiffness of the trailing arm used for small-sized frame is also increased.

4 Claims, 2 Drawing Sheets

FOREIGN PATENT DOCUMENTS

| | | |
|---|---|---|
| JP | 2005-254948 | 9/2005 |
| JP | 2006182142 A * | 7/2006 |
| KR | 10-2002-0049105 A | 6/2002 |
| KR | 10-2004-0042715 A | 5/2004 |
| KR | 10-2005-0029502 A | 3/2005 |

OTHER PUBLICATIONS

Suzuki et al., Rear Suspension Structure of Vehicle, Jul. 13, 2006, JPO, Machine translation of Description.*

* cited by examiner

TRAILING ARM MOUNTING DEVICE FOR VEHICLE WITH SMALL-SIZED FRAME

CROSS-REFERENCE TO RELATED APPLICATIONS

The present application is based on, and claims priority from, Korean Application Serial Number 10-2007-0100255, filed on Oct. 5, 2007, the disclosure of which is hereby incorporated by reference herein in its entirety.

FIELD OF THE INVENTION

The present invention relates to a trailing arm mounting device, particularly a trailing arm mounting device for a vehicle with a small-sized frame.

BACKGROUND OF THE INVENTION

In general, a vehicle is classified into a frame type vehicle mid a monocoque type vehicle.

A frame type of vehicle is provided with a frame as a basic chassis and allows saving cost by expansion of modularization and ride performance by isolating vibration due to the frame and a bush of a car body, whereas a monocoque type of vehicle has a low floor, such that it is possible to reduce the height of the vehicle from the ground, improve roll performance, and develop stylish vehicles.

By applying the characteristics of the frame type and monocoque type as described above to a vehicle, that is, when a frame is applied to a vehicle that is designed for the monocoque type, it is possible to simultaneously obtain the advantages of a frame type of vehicle and a monocoque type of vehicle as well.

However, when a frame is applied to a vehicle, it needs to reduce the size of the frame. Therefore, it is required to manufacture a small-sized frame, which causes limitation on the weight and cross section of a car body. Accordingly, the small-sized frame has smaller dynamic stiffness at the connection portion of a trailing arm mounted to the fame than a large frame having sufficient weight and cross section.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

It is an object of the invention to increase dynamic stiffness without increase in weight of the connection portion of a trailing arm of a small-sized frame applied to a vehicle by expanding the connection portion of the trailing arm to a cross member.

Exemplary embodiments of the present invention provide a trailing arm mounting device for a vehicle with a small-sized frame including a mounting assembly that is connected with a cross member that is transversely disposed is provided to a small-sized frame, and where a trailing arm including a suspension is fastened.

The mounting assembly includes a body mounting bracket, an inner mounting bracket, and an outer mounting bracket. The body mounting bracket connects the small-sized frame to a car body at a connection portion of the cross-member that is transversely disposed. The inner mounting bracket is disposed apart from the cross member inside the small-sized frame and connected to the mounting bracket. The outer mounting bracket is connected to the inner mounting bracket from outside of the small-sized frame.

The inner mounting bracket has a bracket body with a connecting end where the trailing arm is inserted and fastened by at least a bolt and a bracket extension body that extends from a side of the bracket body toward the mounting bracket. The outer mounting bracket has a connecting end that is fastened to the inner mounting bracket by at least a bolt and a bracket body that is integrally formed with the connecting end and fastened to the outside of the small-sized frame.

Further, a stiffness reinforcement bracket is further attached to the inside of the inner mounting bracket to increase the stiffness of the inner mounting bracket fastened to the trailing arm. The stiffness reinforcement mounting bracket has a connecting end where a portion of the trailing arm inserted in the inner mounting bracket is fastened by at least a bolt and a bracket body that is integrally formed with the connecting end and disposed in contact with the upper portion of the bracket body of the inner mounting bracket.

According to embodiments of the invention as described above, it is possible to increase dynamic stiffness at the connection portion of a trailing arm without causing deformation of a frame of a vehicle with a small-sized frame that is light and positioned low from the ground.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
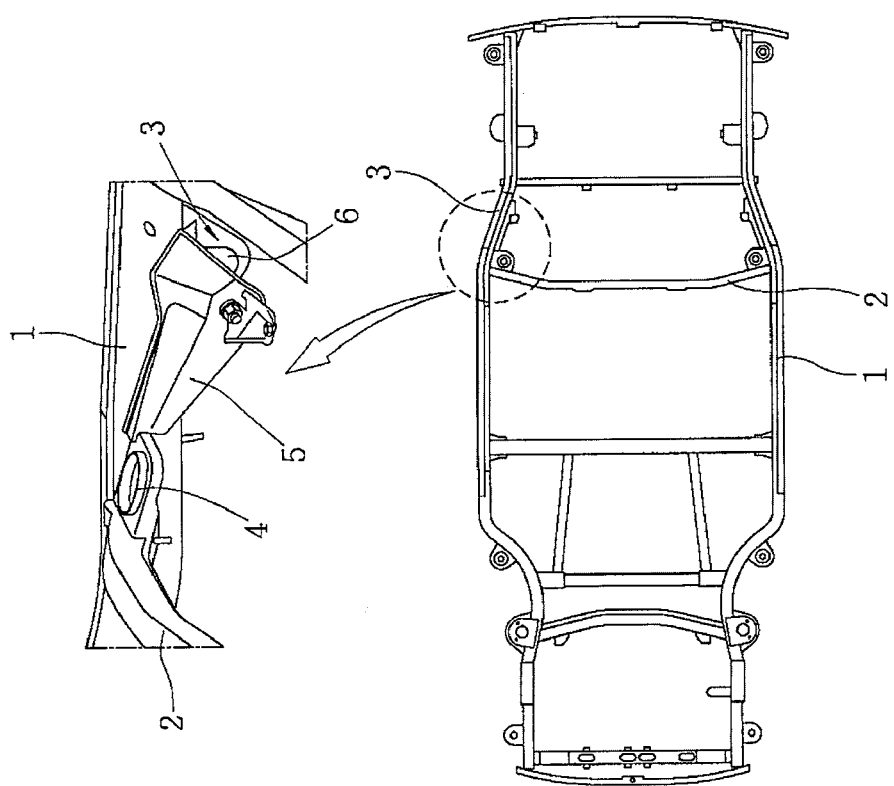
FIG. 1 is a view showing the configuration of a trailing arm mounting device for a vehicle with a small-sized frame according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 shows the configuration of a trailing arm mounting device for a vehicle with a small-sized frame according to an exemplary embodiment of the present invention.

A trailing arm is mounted to a small-sized frame 1 that is included in the vehicle frame with a cross member 2 that is transversely disposed. A mounting assembly 3 that fastens the trailing arm to small-sized frame 1 is connected with a body mounting bracket 4 that is connected with cross member 2. From this configuration, the dynamic stiffness of the mounting portion is increased, without increase in weight at the connection portion of the trailing arm.

Mounting assembly 3 includes body mounting bracket 4, inner mounting bracket 5, and outer mounting bracket 7.

The body mounting bracket 4 is disposed at a portion of small-sized frame 1 where an end portion of cross member 2 that is transversely provided is disposed.

The inner mounting bracket 5 is disposed apart from cross member 2 inside small-sized frame 1 and connected with a portion of body mounting bracket 4.

The outer mounting bracket 7 is connected to a portion of the inner mounting bracket 5 from outside of small-sized frame 1.

Further, a stiffness reinforcement bracket 6 is additionally attached to the inside of the inner mounting bracket 5 to increase the stiffness of the inner mounting bracket 5 fastened to the trailing arm.

Figure 2:
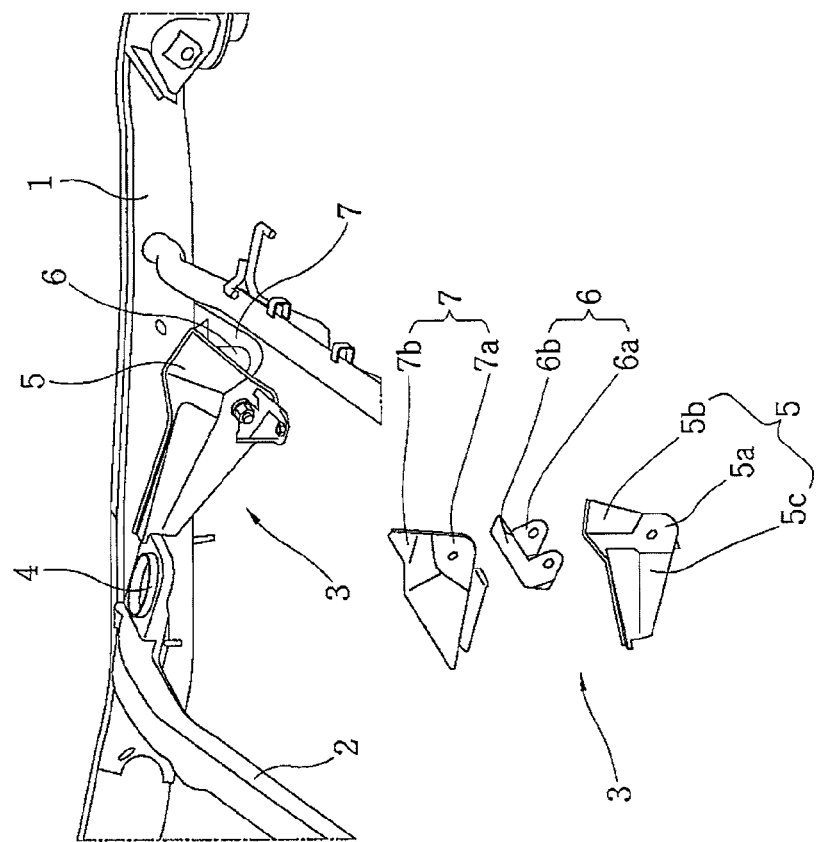
FIG. 2 is a view illustrating the configuration of a trailing arm mounting device for a vehicle according to an exemplary embodiment of the present invention.

As shown in FIG. 2, the inner mounting bracket 5 includes connecting end 5a, bracket body 5b, and bracket extension body 5c.

In detail, the inner mounting bracket 5 has a bracket body 5b with a connecting end 5a where the trailing arm is inserted and fastened by at least a bolt (not shown) and a bracket extension body 5c that extends from a side of bracket body 5b toward mounting bracket 4.

The more bracket extension body 5c extends from bracket body 5b toward the body mounting bracket 4, the more the width of the bracket extension body 5c decreases.

Further, the outer mounting bracket 7 has a connecting end 7a that is fastened to the inner mounting bracket 5 by at least a bolt (not shown) and a bracket body 7b that is integrally formed with the connecting end 7a and fastened to the outside of small-sized frame 1.

Further, stiffness reinforcement mounting bracket 6 has a connecting end 6a where the trailing arm inserted in the inner mounting bracket 5 is fastened by at least a bolt and a bracket body 6b that is integrally formed with the connecting end 6a and disposed in contact with the upper portion of the bracket body 5b of the inner mounting bracket 5.

Inner mounting bracket 5, stiffness reinforcement mounting bracket 6, and outer mounting bracket 7 are fixed by welding. Further, inner mounting bracket 5 and outer mounting bracket 7, and small-sized frame 1 and body mounting bracket 4 are also fixed by welding.

Therefore, according to an exemplary embodiment of the present invention, mounting assembly 3 that connects small-sized frame 1 and the trailing arm and has a limit on the weight and cross section by reducing the size of frame expands the fixing portion for small-sized frame 1. Accordingly, the fastening force of the trailing arm through mounting assembly 3 is increased and the dynamic stiffness of a portion of the trailing arm used for small-sized frame 1 is also increased.

Therefore, in mounting assembly 3 according to an exemplary embodiment of the present invention, bracket extension body 5c of the inner mounting bracket 5 that is disposed inside the small-sized frame 1 and where the trailing arm is fastened is fixed to body mounting bracket 4. From this structure, body mounting bracket 4 that is provided to small-sized frame 1 to fasten small-sized frame 1 to the car body supports the fastening force of the trailing arm effectively.

That is, as shown in FIG. 2, inner mounting bracket 5 of mounting assembly 3 has bracket extension body 5c connected from the inside of small-sized frame 1 to body mounting bracket 4, stiffness reinforcement mounting bracket 6 is inserted under bracket body 5b that bracket extension body 5c extends from, outer mounting bracket 7 contacts with the bracket body 5b from outside of small-sized frame 1, and the trailing arm is inserted and fastened by at least a bolt.

As described above when the trailing arm is inserted into and fastened to mounting assembly 3, the tailing arm is fastened to bracket body 5b of inner mounting bracket 5, together with stiffness reinforcement mounting bracket 6 and outer mounting bracket 7, and the end of bracket extension body 5c of inner mounting bracket 5 is fixed to body mounting bracket 4; therefore, the fastening force of the trailing arm to mounting assembly 3 is increased.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A trailing arm mounting device for a vehicle with a small-sized frame comprising:
  a mounting assembly that is connected with an end portion of a cross member that is transversely disposed to the vehicle, and is provided to the small-sized frame,
  wherein the mounting assembly includes:
    a body mounting bracket that is connected to the cross member at a connection portion of the cross-member that is transversely disposed;
    an inner mounting bracket that is disposed apart from the cross member inside the small-sized frame and connected to a portion of the body mounting bracket; and
    an outer mounting bracket that is connected to a portion of the inner mounting bracket and outside of the small-sized frame,
  wherein a stiffness reinforcement mounting bracket is further attached to an inside of the inner mounting bracket to increase the stiffness of the inner mounting bracket, and
  wherein the stiffness reinforcement mounting bracket has:
    a first connecting end; and
    a first bracket body that is integrally formed with the connecting end and disposed in contact with an upper portion of a second bracket body of the inner mounting bracket.

2. The trailing arm mounting device for the vehicle with the small-sized frame as defined in claim 1,
- wherein the inner mounting bracket has:
- the second bracket body; and
- a second connecting end integrally formed to the second bracket body;
- a bracket extension body that extends from a side of the second bracket body toward the body mounting bracket, and
- wherein the outer mounting bracket has:
- a third connecting end that is fastened to a portion of the inner mounting bracket by at least a bolt; and
- a third bracket body that is integrally formed with the connecting end and fastened to the outside of the small-sized frame.

3. The trailing arm mounting device for the vehicle with the small-sized frame as defined in claim 2, wherein the more the bracket extension body extends from the second bracket body toward the body mounting bracket, the more the width of the bracket extension body decreases.

4. The trailing arm mounting device for the vehicle with the small-sized frame as defined in claim 1,
- wherein the body mounting bracket is connected to the cross member and the small-sized frame at the connection portion of the cross-member,
- wherein the inner mounting bracket is connected to the portion of the body mounting bracket and the small-sized frame, and
- wherein the outer mounting bracket is connected to the portion of the inner mounting bracket and the small-sized frame.

* * * * *